United States Patent [19]

Boeckmann et al.

[11] Patent Number: 4,708,245

[45] Date of Patent: Nov. 24, 1987

[54] CARRIER TAPE

[75] Inventors: Hugo Boeckmann, Arlington Heights, Ill.; Glenn E. Huff, Bedford, Tex.; Paul A. Tilman, New City, N.Y.

[73] Assignee: Illinois Tool Works Inc., Chicago, Ill.

[21] Appl. No.: 8,293

[22] Filed: Jan. 29, 1987

Related U.S. Application Data

[63] Continuation-in-part of Ser. No. 913,131, Sep. 25, 1986.

[51] Int. Cl.$^4$ .............................................. B65D 73/02
[52] U.S. Cl. .................................... 206/330; 206/332; 206/23.8; 206/306
[58] Field of Search ............... 206/328, 329, 330, 332, 206/334, 562, 564, 587, 588; 220/23.8, 23.2, 306

[56] References Cited

U.S. PATENT DOCUMENTS

| | | | |
|---|---|---|---|
| 3,465,874 | 9/1969 | Hugle et al. | 206/330 |
| 3,785,895 | 1/1974 | Ettre et al. | 206/330 |
| 3,920,121 | 11/1975 | Miller | 206/330 |
| 4,069,910 | 1/1978 | Fowler et al. | 206/330 |
| 4,657,137 | 4/1987 | Johnson | 206/330 |

Primary Examiner—Joseph Man-Fu Moy
Attorney, Agent, or Firm—Kane, Dalsimer, Sullivan, Kurucz, Levy, Eisele and Richard

[57] ABSTRACT

A carrier tape is provided comprising a longitudinally extending base strip, a generally coextensive cover strip, and at least one elongated profile strip bonded to one of the other strips. Each of the strips is extruded of a plastic material and at least one of the base or cover strips is formed with an integral longitudinal profile which engages the profile of the profile strip in a continuous mechanical interlock. The base strip is provided with longitudinally spaced cavities for receiving products to be carried. Either the base strip or profile strip is provided with spaced sprocket holes for driving the tape.

14 Claims, 4 Drawing Figures

CARRIER TAPE

CROSS REFERENCE TO RELATED APPLICATIONS

The present application is a continuation-in-part of application Ser. No. 913,131, filed Sept. 25, 1986, entitled REUSEABLE CARRIER TAPE.

BACKGROUND OF THE INVENTION

The present invention relates to carrier tapes and in particular to a reuseable carrier tape for transporting electronic components, pharmaceuticals, and the like during production and assembly operations.

In the assembly of various types of electronic devices, such as, for example, computers and related products, it is common to transport miniature and subminiature components from the component manufacturer to a customer's assembly station(s) by means of a carrier tape. At this point automatic equipment functions to remove the components from the carrier tape and mount the components to a circuit board or the like as may be required. The carrier tape (or transfer tape as it is sometimes referred to) may also function to bring different components to an assembly station in proper order for sequential assembly. Such tapes are often formed from an elongated base strip of plastic, foil or paper and are usually covered by a cover strip. The base strip is often provided with cavities which are sized to hold the components in a particular orientation. The cover strip is usually held in place by an adhesive or heat bond which must be peeled away at the assembly station to permit the component to be removed after the cover is stripped back. Typical examples of prior art carrier tapes are disclosed in U.S. Pat. Nos. 3,465,874; 3,650,430; 3,700,019; 3,894,896; 3,910,410 and 4,298,120.

A problem often associated with such prior carrier tapes is that the top tape or cover sheet must be securely affixed to the bottom tape or base and the adhesive bond must subsequently be broken without damaging the carrier tape or sticking to the component since this could interfere with the transport and assembly mechanism. An essential requirement of the top tape is that it must separate from the bottom carrier tape at a known and predictable rate without disturbing the components. This is known as consistent peel strength. In the past adhesives and heat sealing were the principal means for sealing the top and bottom tapes which often rendered these non-reuseable. In many ultra-clean applications the use of such adhesives and heat bonds is undesirable out of concern that residue may contaminate the component or mounting board. In addition, heat seal bonds are generally non-uniform due to the occurrence of tiny hills and valleys on the strip during the heating operation. This may result in the cover sheet stripping away prematurely, (which could result in lost components) or remaining in place overly long. In either event the automatic operation would be interfered with.

Also, with many electronic components it is desirable to load the carrier tape with static-dissipative or conductive materials to prevent or dissipate any build-up of electrostatic charge. These materials often tend to interfere with the bonding characteristics of the adhesives used.

In U.S. Pat. Nos. 3,465,874 and 3,650,430 an attempt is made to solve these problems by providing spaced snaps or push buttons on one of the strips to engage spaced holes in the other of the strips. This arrangement, obviously requires somewhat precise alignment of the snaps and openings in order to operate. Further, the strips are not uniformly secured to each other but rather continuously oscillate between secured and non-secured conditions.

In copending application Ser. No. 913,131 an improved carrier tape construction is described in which the base and cover strips are uniformly and consistently secured to each other and which requires a uniform force for separation so that they may readily be separated in a precise manner. At least one of the strips is provided with an integrally formed, longitudinally extending continuous profile which cooperates with surfaces of the other strip to secure the two in a locking engagement. While this arrangement solves most of the problems associated with prior art carrier tapes it requires relatively complex, and hence, relatively expensive extrusion techniques since the profile is formed integrally with at least one of the base and cover strips. This also limits, to some extent the configuration of and location of the profile. In addition, the carrier tape must be configured for a particular component to be transported as well as a particular drive arrangement since the former determines the cavity configuration and spacing while the latter determines the sprocket hole sizing and spacing.

In view of the above, it is the principal object of the present invention to provide an improved carrier tape construction which incorporates the advantages of the carrier tape disclosed in application Ser. No. 913,131 but which more readily lends itself to more conventional and economic manufacturing techniques.

A further object is to provide such a carrier tape wherein there is a greater degree of flexibility with regard to the associated components and drive assemblies than has heretofore been available.

SUMMARY OF THE INVENTION

The above and other beneficial objects and advantages are attained in accordance with the present invention by providing an improved carrier tape comprising an elongated base strip, an elongated cover strip, and at least one elongated profile strip bonded to one of the other strips, preferably the base strip. Each of the strips is formed of a plastic film material. One of the strips, usually the base strip, is provided with longitudinally spaced cavities for the components. Longitudinally spaced sprocket drive holes for advancing the tape through the assembly mechanism are provided on the base or profile strip. The profile strip is provided with a longitudinally extending continuous, integrally formed profile which cooperates with surfaces of the cover strip to secure the base and cover in a locking engagement.

DETAILED DESCRIPTION OF THE PREFERRED EMBODIMENTS

Figure 1:
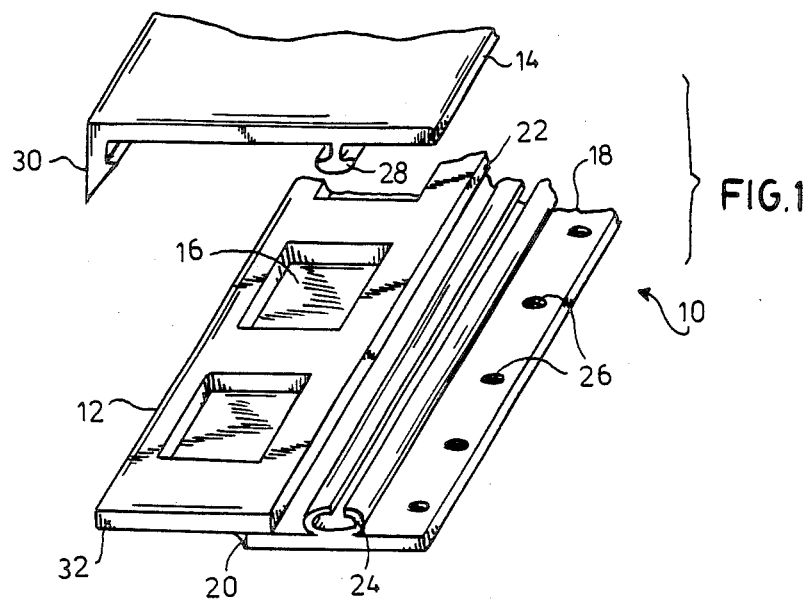
FIG. 1 is a perspective view of a first embodiment of a carrier tape in accordance with the present invention.
Figure 2:
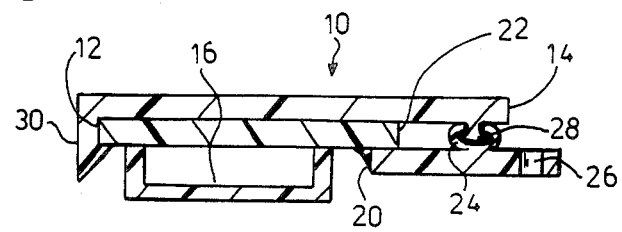
FIG. 2 is an elevational sectional view of the carrier tape of FIG. 1.

Reference is now made to the drawings and to FIGS. 1 and 2 in particular wherein a first embodiment of the carrier tape 10 of the present invention is depicted as comprising an elongated base strip 12 and a generally coextensive cover strip 14. The carrier tape 10 is preferably formed of a suitable plastic film material such as a carbon loaded polyvinyl chloride, polypropylene or a glycol based polyester such as polyethylene terephthalate (PETG) which may readily be extruded and vacuum or pressure formed to the desired shape. The tape should be sufficiently flexible to permit it to be spooled. The base 12 is formed with a plurality of cavities 16 which define individual pockets for the components to be transported. In this regard the cavities may be contoured, as required, to maintain the components in a particular orientation should such orientation be necessary.

The carrier tape 10 further includes a profile strip 18 which is bonded along a side margin 20 to a side 22 of the base strip 12. The profile strip may be formed of the same material as the base and/or cover strip or, if advantageous to do so, may be formed of a different material. The profile strip 18 may be adhesively bonded, heat sealed, or otherwise secured to the base strip along a continuous elongated bond line.

The profile strip 18 is extruded with an integral, continuous elongated profile shape 24. The profile may, for example, be in the shape of the female profile described in U.S. Pat. No. Re. 28,969. A line of longitudinally spaced sprocket holes 26 is provided on the profile strip outboard of the profile 24. That is, the profile 24 is interposed between margin 20 and the sprocket holes. The sprocket holes 26 are of a size and spaced so as to permit the carrier tape to be advanced by a sprocket drive of the associated equipment with which the tape is to be used.

The cover strip 14 is provided along one side with a male profile 28 designed to cooperate with the female profile 24 to form a continuous mechanical interlock as discussed in the aforementioned U.S. Pat. No. Re. 28,969. A second profile, in the form of a hook 30 is provided on the opposite side of cover strip 14. As shown in FIG. 2, the hook 30 clamps under the side 32 of base member 12 to cooperate with the female and male profiles 24,28 in securing the cover strip 14 to base strip 12.

Figure 3:
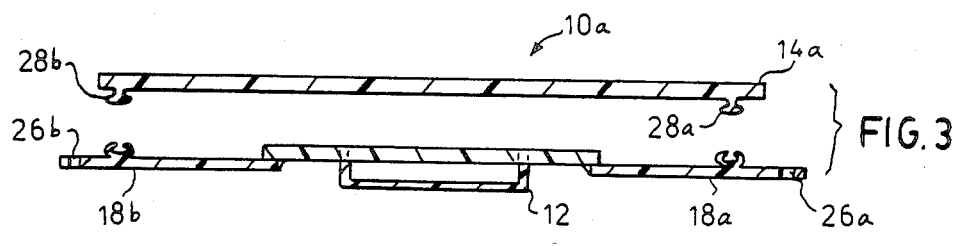
FIG. 3 is an elevational sectional view of a second embodiment of the carrier tape of the present invention; and, FIG. 4 is an elevational sectional view of a third embodiment of the carrier tape of the present invention.

In the embodiment of FIG. 3, the base strip 12 is provided with profile strips 18a and 18b which are each bonded to the base strip along both the left and right sides. As in the previously described embodiment, the profile strips 18a and 18b are bonded to the base strip along continuous side margins. By providing sprocket holes 26a and 26b on both profile strips 18a and 18b the assembled carrier tape 10a may be driven from either the left or right side. The cover strip 14a of this embodiment is provided with male profiles 28a and 28b along both sides thereof for continuous engagement with the female profiles 26a and 26b of profile strips 18a and 18b, respectively.

Figure 4:
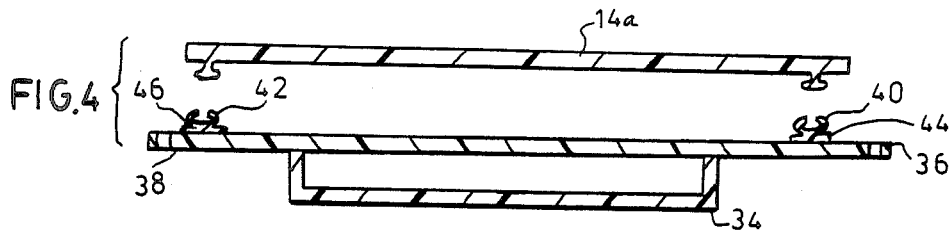

In the embodiment of FIG. 4, the base strip 34 is provided with two parallel lines of sprocket holes 36 and 38 along both sides. The profile strips 40, 42 are each provided with bottom margins 44, 46, respectively, which are continuously bonded to the top of the base strip positioned on opposite sides of the component cavities inboard of the sprocket holes. The cover strip 10a for this embodiment is the same, in construction, as that for the embodiment of FIG. 3. It should be realized, however, that by omitting one of the profile strips the cover strip of the FIG. 1 embodiment could be used.

It should be appreciated that in the embodiments of the present invention depicted in FIGS. 1-3 the base strip may be formed without regard to the drive arrangement of the mechanism to be used with the carrier tape since the sprocket holes for the drive assembly are contained in the separate profile tape. Similarly, the profile strips may be formed without regard to the components to be conveyed since the component cavities are in separate base strips. In this manner, each of the carrier tape parts may be manufactured in the most efficient manner without adversely affecting any other part.

Thus, in accordance with the above the aforementioned objects are effectively attained.

Having thus described the invention, what is claimed is:

1. A carrier tape comprising:
   an elongated base strip;
   an elongated cover strip, substantially coextensive in length with said base strip;
   a plurality of component cavities spaced longitudinally along one of said elongated strips;
   at least one profile strip substantially coextensive in length with said elongated strips and containing thereon a longitudinally extending integrally formed continuous profile, said profile strip including a margin portion extending parallel to said profile, said margin being bonded to one of said elongated strips; and,
   longitudinally extending continuous surfaces on the other of said elongated strips contoured to engage said profile whereby to secure said elongated strips in a releasable, continuous mechanical bond.

2. The carrier tape in accordance with claim 1 wherein at least one of said strips includes a plurality of aligned, longitudinally spaced sprocket holes.

3. The carrier tape in accordance with claim 2 wherein said margin portion is disposed along side said profile and said sprocket holes are disposed on said profile strip on the opposite side of said profile from said margin.

4. The carrier tape in accordance with claim 3 wherein said profile strip is bonded to said base strip.

5. The carrier tape in accordance with claim 4 wherein said profile strip is continuously bonded along one longitudinal side of said base strip.

6. The carrier tape in accordance with claim 5 further comprising a second profile strip continuously bonded along the opposite longitudinal side of said base strip.

7. The carrier tape in accordance with claim 2 wherein said sprocket holes are disposed on said base strip.

8. The carrier tape in accordance with claim 7 wherein said profile strip is bonded to said base strip inboard of said sprocket holes.

9. The carrier tape in accordance with claim 2 wherein said component cavities are disposed along said base strip; said sprocket holes are disposed along two parallel lines on opposite sides of said cavities and said profile strip is bonded to said base strip between one of said lines of sprocket holes and said component cavities.

10. The carrier tape in accordance with claim 9 further comprising a second profile strip bonded to said base strip between the other of said lines of sprocket holes and said component cavities.

11. The carrier tape in accordance with claim 10 wherein said profile strips contain identical profiles thereon.

12. The carrier tape in accordance with claim 5 wherein said cover strip includes, adjacent one edge, a longitudinal extending continuous profile adapted to mate in an interlocking relationship with said profile strip profile and means adjacent the other edge of said cover strip to engage said base strip.

13. The carrier tape in accordance with claim 6 wherein said cover strip includes adjacent one edge a first longitudinally extending continuous profile adapted to mate, in an interlocking engagement with said one profile strip profile and, adjacent the other edge, a second longitudinally extending continuous profile adapted to mate, in an interlocking engagement, with said second profile strip profile.

14. The carrier tape in accordance with claim 9 wherein said cover strip includes, adjacent one edge a first longitudinally extending continuous profile adapted to mate, in an interlocking engagement with said one profile strip profile and, adjacent the other edge, a second longitudinally extending continuous profile adapted to mate, in an interlocking engagement, with said second profile strip profile.

* * * * *